(12) United States Patent
Golla

(10) Patent No.: US 7,606,140 B2
(45) Date of Patent: Oct. 20, 2009

(54) DISTRIBUTED AND DISJOINT FORWARDING AND ROUTING SYSTEM AND METHOD

(75) Inventor: Prasad N. Golla, Plano, TX (US)

(73) Assignee: Alcatel Lucent, Paris (FR)

( * ) Notice: Subject to any disclaimer, the term of this patent is extended or adjusted under 35 U.S.C. 154(b) by 1129 days.

(21) Appl. No.: 10/651,134

(22) Filed: Aug. 28, 2003

(65) Prior Publication Data

US 2005/0050136 A1 Mar. 3, 2005

(51) Int. Cl.
*G06F 11/00* (2006.01)
(52) U.S. Cl. .......................................... 370/216; 714/4
(58) Field of Classification Search ................ 370/219, 370/220, 218, 401, 402, 386, 465, 216, 229, 370/238, 419, 395.54, 351, 319, 395.31, 370/230; 714/4, 43; 709/238; 398/30
See application file for complete search history.

(56) References Cited

U.S. PATENT DOCUMENTS

| | | | | |
|---|---|---|---|---|
| 6,885,635 | B1* | 4/2005 | Haq et al. .................... | 370/219 |
| 6,985,493 | B1* | 1/2006 | Roumas ....................... | 370/465 |
| 7,190,896 | B1* | 3/2007 | Wang et al. ................... | 398/30 |
| 7,212,526 | B2* | 5/2007 | Kanetake ..................... | 370/386 |
| 7,224,668 | B1* | 5/2007 | Smethurst et al. ........... | 370/229 |
| 7,292,535 | B2* | 11/2007 | Folkes et al. ................. | 370/238 |
| 7,317,731 | B2* | 1/2008 | Seddigh et al. .............. | 370/419 |
| 7,363,285 | B2* | 4/2008 | Kalyanaraman et al. ........ | 707/2 |
| 7,415,028 | B1* | 8/2008 | Allam ................... | 370/395.54 |
| 7,415,627 | B1* | 8/2008 | Radhakrishnan et al. ....... | 714/4 |
| 7,457,277 | B1* | 11/2008 | Sharma et al. ............... | 370/351 |
| 2002/0097672 | A1* | 7/2002 | Barbas et al. ................ | 370/216 |
| 2002/0114276 | A1* | 8/2002 | Basturk ....................... | 370/230 |
| 2002/0194369 | A1* | 12/2002 | Rawlins et al. .............. | 709/238 |
| 2003/0051048 | A1 | 3/2003 | Watson et al. | |

(Continued)

FOREIGN PATENT DOCUMENTS

EP   1 271 861 A2   1/2003

(Continued)

OTHER PUBLICATIONS

Recovery from control plane failures in the CR-LDP signalling protocol; Jing Wu; Savoie, J.M.; Montuno, D.Y.; Mouftah, H.T.; Communications, 2003. ICC '03. IEEE International Conference on vol. 2, May 11-15, 2003 pp. 1309-1313 vol. 2.*

(Continued)

*Primary Examiner*—Edan Orgad
*Assistant Examiner*—Salman Ahmed

(57) ABSTRACT

A distributed and disjoint forwarding and routing system and method operable with a routing element having a scalable cluster-based architecture, wherein the control plane and data plane are loosely-coupled for effectuating non-disruptive switchover in the event of a failure. The routing element includes a partitionable data plane having one or more forwarding tables and a partitionable control plane having one or more routing tables operating under control of at least one routing protocol process. One or more update buffers are provided with respect to the forwarding and routing tables. A partitionable update agent module is disposed between the data and control planes for mediating the updating and coordination of the forward tables based on the routing tables.

17 Claims, 6 Drawing Sheets

U.S. PATENT DOCUMENTS

| | | | |
|---|---|---|---|
| 2003/0128668 A1 | 7/2003 | Yavatkar | |
| 2003/0137978 A1* | 7/2003 | Kanetake | 370/386 |
| 2003/0210705 A1* | 11/2003 | Seddigh et al. | 370/419 |
| 2004/0100969 A1* | 5/2004 | Sankar et al. | 370/395.31 |
| 2004/0131079 A1* | 7/2004 | Hegde et al. | 370/466 |
| 2004/0246976 A1* | 12/2004 | Balakrishnan et al. | 370/395.41 |
| 2004/0255202 A1* | 12/2004 | Wong et al. | 714/43 |
| 2005/0018602 A1* | 1/2005 | Labovitz | 370/229 |
| 2006/0149524 A1* | 7/2006 | Kalyanaraman et al. | 703/13 |

FOREIGN PATENT DOCUMENTS

| | | | |
|---|---|---|---|
| EP | 1511238 A2 * | 7/2004 | |

OTHER PUBLICATIONS

Link Management Protocol Automatic Control Plane Configuration Extensions for Resilient Ring-based Architectures; Perello, J.; Escalona, E.; Spadaro, S.; Comellas, J.; Junyent, G.; Transparent Optical Networks, 2006 International Conference on vol. 3, Jun. 18-22, 2006 pp. 165-168.*

Recovery from control plane failures in the CR-LDP and O-UNI signalling protocols; Wu, J.; Savoie, M.; Mouftah, H.T.; Montuno, D.Y.; Design of Reliable Communication Networks, 2003. (DRCN 2003). Proceedings. Fourth International Workshop on Oct. 19-22, 2003 pp. 139-146.*

Yakov Rekhter and Rahul Aggarwal, "Graceful Restart Mechanism for BGP with MPLS", http://www.ietf.org/internet-drafts/draft-ietf-mpls-bgp-mpls-restart-02.txt, Network Working Group, Apr. 2003, pp. 1-12.

M. Leelanivas, Y. Rekhter and R. Aggarwal, "Graceful Restart Mechanism for Label Distribution Protocol", ftp://fty.isi.edu/in-notes/rfc3478.txt, Network Working Group, Feb. 2003, pp. 1-13.

"Can IP Support Mission-Critical Traffic?", www.chiaro.com, Chiaro Networks, 2002, pp. 1-8.

Guangzhi et al., "Control Plane Design for Reliable Optical Networks", IEEE Communications Magazine, IEEE Service Center, Piscataway, US, vol. 40, No. 2, Feb. 1, 2002, pp. 90-96.

Gopal R., "Seperation of control &forwarding plane inside a network element" High Speed Networks & multimedia Comm. 5th IEEE Int. Conf. Piscataway US Jul. 3, 2002, pp. 161-166.

* cited by examiner

DISTRIBUTED AND DISJOINT FORWARDING AND ROUTING SYSTEM AND METHOD

BACKGROUND OF THE INVENTION

1. Technical Field of the Invention

The present invention generally relates to communications networks. More particularly, and not by way of any limitation, the present invention is directed to an architecture for implementing a distributed and disjoint forwarding and routing scheme that provides for high availability in a communications network.

2. Description of Related Art

Core IP backbone networks are evolving to support more than just Internet data traffic. Much of the traffic that now needs to run over IP—such as voice, video, and mission-critical business traffic through virtual private networks (VPNs)—requires higher availability than the conventional data applications (e.g., email, web browsing, et cetera) demand. To support the growing portion of the Internet communications containing mission-critical traffic, core routers will need to be improved so they can provide the high availability now required.

However, today's currently deployed routers are not designed to provide this new level of availability that the new IP traffic requires, e.g., 99.999% uptime (commonly referred to as "five nines" availability). In essence, they lack the robustness and key features that would allow carriers to achieve five nines availability—one of which being the ability to maintain forwarding and routing during failures and upgrades.

SUMMARY OF THE INVENTION

Accordingly, the present invention advantageously provides a distributed and disjoint forwarding and routing system and method operable with a routing element having a scalable cluster-based architecture, wherein the control plane and data plane are loosely-coupled for effectuating non-disruptive switchover in the event of a failure.

In one aspect, the present invention is directed to a router that includes a partitionable data plane having one or more forwarding tables and a partitionable control plane having one or more routing tables operating under control of at least one routing protocol process. Each forwarding table includes a forwarding information base (FIB) operable to effectuate a forwarding process through the router with respect to incoming data, e.g., packets, cells, frames, etc. Each routing table includes a routing information base (RIB) related to the applicable routing protocol for effectuating routing decisions with respect to the data forwarding process through the router. A control plane update agent module is provided for maintaining a redundant set of routing table information in at least one control plane update buffer, wherein the control plane update agent module is operable to synchronize the routing tables in the control plane in a time-based or event-based manner, or both. A data plane update agent module is operably coupled to the control plane update agent module for asynchronously coordinating the updating of the forwarding table information based on the routing table information in association with a set of data plane update buffers. In the event of a failure, the data forwarding process continues to proceed based on information stored in at least one of the data plane or control plane update buffers even as a switchover operation is underway in the router.

In one embodiment, the data plane and control plane update agent modules may be integrated into a single interplane updating mechanism disposed between the data and control planes for mediating the updating and coordination process therebetween. In another embodiment, the data and control planes may be logically partitioned into a plurality of virtual partitions, each with one or more data plane nodes and one or more control plane nodes, respectively. The data plane nodal complex and the control plane nodal complex may each be organized into a separate scalable cluster-based network having any known or heretofore unknown topology, e.g., a topology selected from the group consisting of ring topologies, star topologies, Clos topologies, toroid topologies, hypercube topologies, or polyhedron topologies, to name a few. By way of an exemplary implementation, a data plane node may include one or more processing engines, one or more forwarding tables with associated update buffers and a data plane update agent. Likewise, a control plane node may include one or more control processors, one or more routing tables with associated update buffers and a control plane update agent.

In another aspect, the present invention is directed to a fault-tolerant routing element having a distributed scalable architecture. A logic structure, e.g., a management module with process status monitoring (PSM) capability, which may comprise any means implemented in software, hardware, firmware, or in combination thereof, is provided for detecting a fault in an active node disposed in the routing element that is engaged in executing a router process. Another structure is provided for effectuating a continuous switchover from the active node to a redundant node responsive to detecting a fatal fault, whereby the redundant node continues to execute the router process without disruption in data forwarding. An updating means is provided for updating routing table information and forwarding table information associated with the routing element responsive to the switchover operation.

In a still further embodiment, the present invention is directed to a distributed network wherein the capability of continuous switchover is effectuated by loosely-coupling the control and data planes over the network. The distributed network comprises at least a first network element operable to route data responsive to applicable control messages provided thereto. At least a second network element is operably coupled to the first network element, wherein the network elements are comprised of a router with decoupled and disjoint control and data planes.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1:
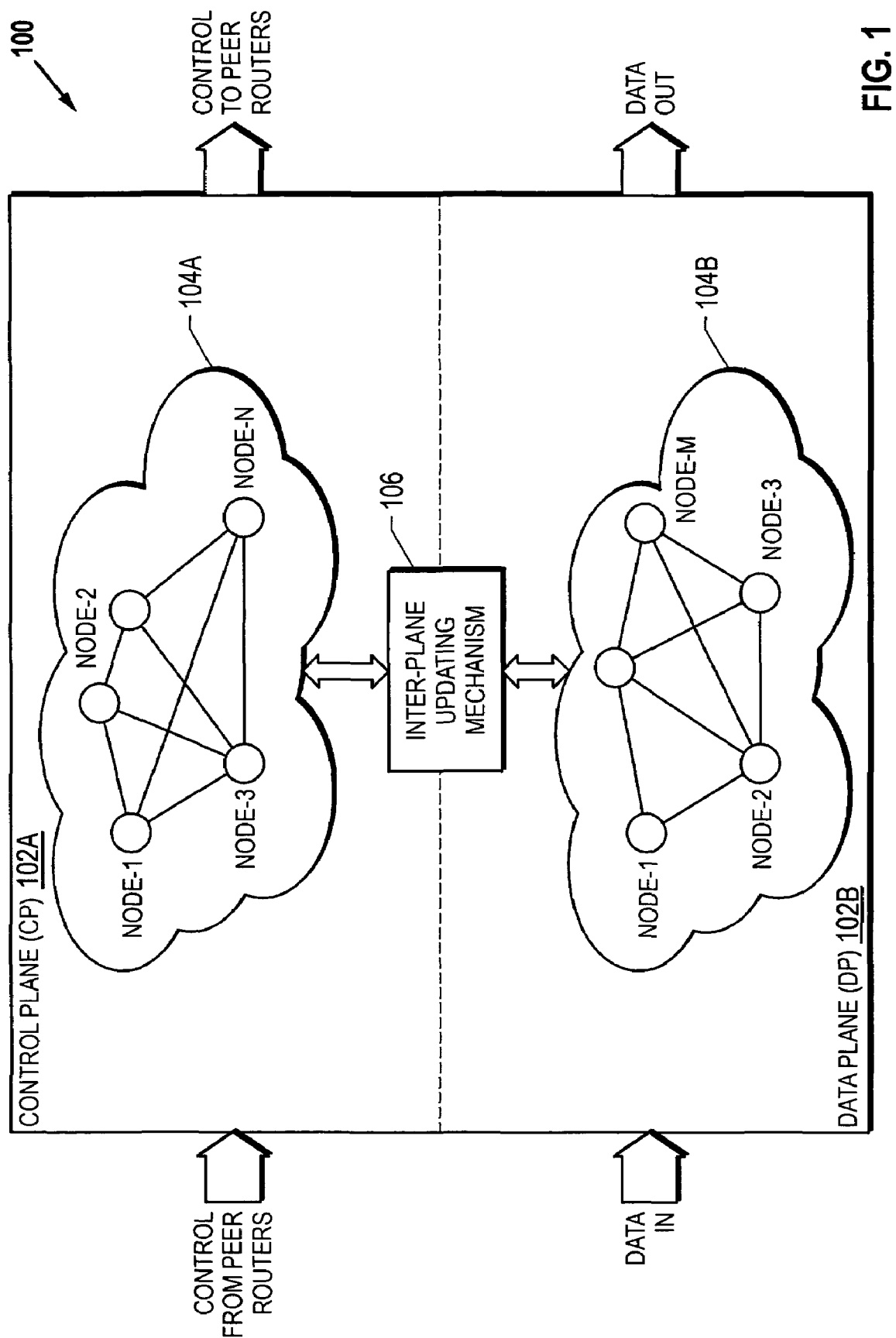
FIG. 1 depicts a high level functional block diagrammatic view of a fault-tolerant routing element having a distributed and disjoint forwarding and routing system and method in accordance with an embodiment of the present invention.

In the drawings, like or similar elements are designated with identical reference numerals throughout the several views thereof, and the various elements depicted are not necessarily drawn to scale. Referring now in particular to FIG. 1, depicted therein is a high level functional block diagrammatic view of a fault-tolerant routing element 100 having a distributed and disjoint forwarding and routing system and method in accordance with an embodiment of the present invention. It should be recognized by those skilled in the art that the routing element 100 is operable to interwork within any type of communications network, organized in known or heretofore unknown network architecture, for effectuating routing functionality with respect to a variety of communications, e.g, data, voice-over-IP, video-over-IP, and other mission-critical applications. Further, the routing element 100 is deemed to be compatible with a host of routing protocols for routing all types of data (packets, cells, and the like, for instance.)

As can be readily seen, the structure and functionality of the routing element 100 may be logically segregated into two planes, a control plane (CP) 102A and a data plane (DP) 102B, that are loosely-coupled for effectuating routing decision-making functionality and data forwarding functionality, respectively. Accordingly, CP 102A and DP 102B may also be referred to as "routing plane" and "forwarding plane," respectively. Each of the planes may preferably be embodied as a cluster-based, scalable distributed network, partitionable into one or more nodes. Reference numeral 104A refers to a plurality (N) of CP nodes interconnected in any known or heretofore unknown network topology, e.g., a topology selected from the group comprised of ring topologies, star topologies, Clos topologies, toroid topologies, hypercube topologies, or polyhedron topologies, just to name a few. Likewise, reference numeral 104B refers to M instances of DP nodes interconnected in a particular topology.

As will be described in greater detail below, each CP or DP node is responsible of effectuating routing functionality or data forwarding functionality, respectively, as part of the network cluster within which it is disposed. Further, CP 102A is operable to receive control inputs or updates (collectively, control messages) from other network elements (e.g., peer routers) to which the routing element 100 is coupled. By way of example, these control messages may comprise router status/availability messages, compatibility messages, routing protocol-specific messages, et cetera. Similarly, CP 102A is capable of generating appropriate control messages towards other peer elements in the communications network.

Although not specifically depicted in FIG. 1, it should be understood that each of the planes is provided with appropriate databases and processing elements (e.g., routing tables with routing information base or RIB instances in the CP domain and forwarding tables with forwarding information base or FIB instances in the DP domain) that may be distributed among the cluster nodes of the plane. In order to achieve fault tolerance in the routing element 100, an inter-plane updating mechanism 106 is disposed between the CP cluster 104A and the DP cluster 104B for providing a loose coupling therebetween, whereby conventional synchronization process between the CP databases (i.e., RIB tables) and DP databases (i.e., FIB tables) is disjoined so that database updating is performed asynchronously. Consequently, as will be described below in further detail, the effect of a fault-induced switchover on the database updating process is not propagated from one plane to the other, thereby greatly reducing the need to arrest or suspend the operation of the entire routing element.

Figure 2A:
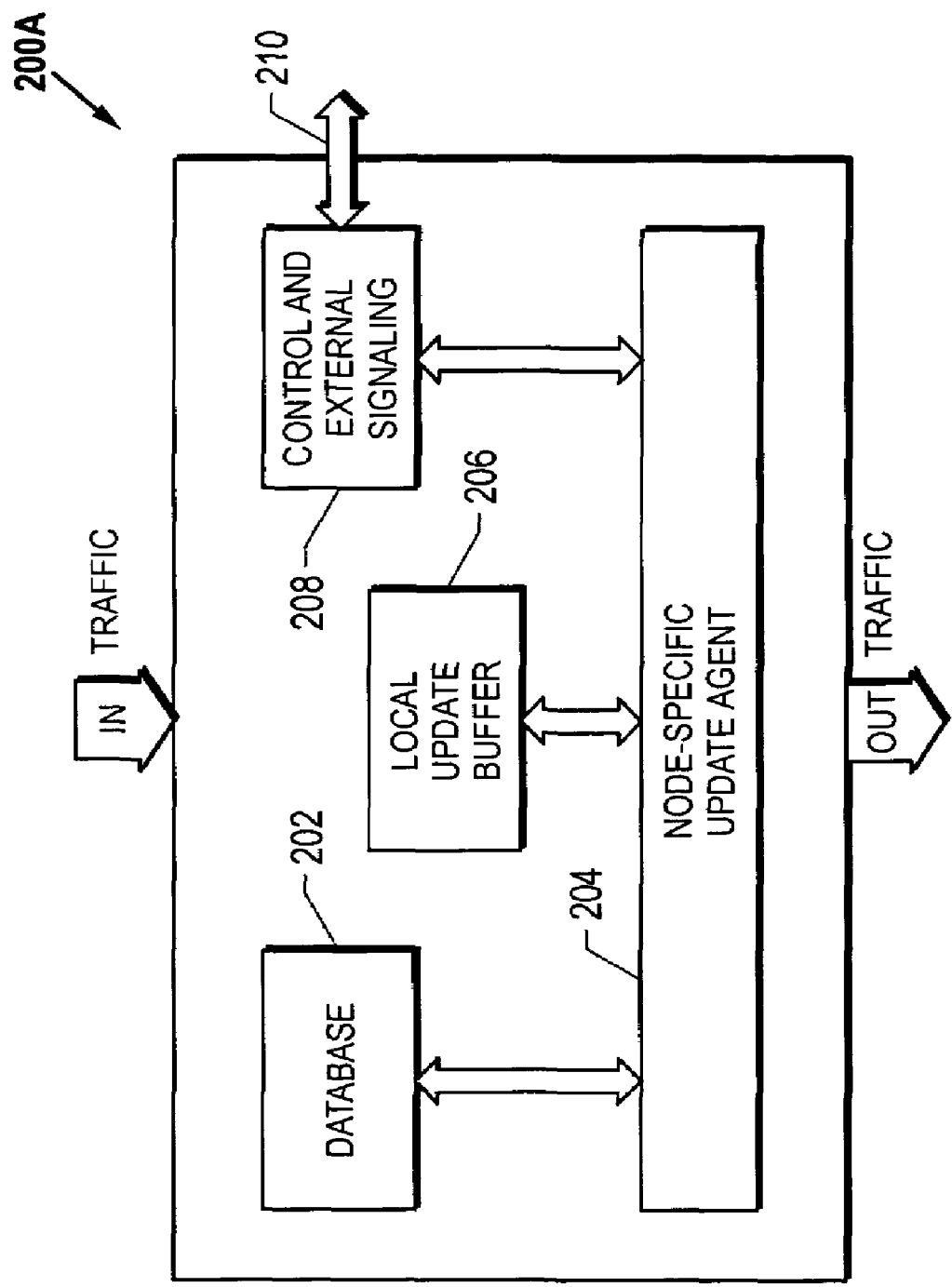
FIG. 2A depicts a functional block diagram of a data plane (DP) node disposed as part of a scalable cluster of a plurality of nodes of the routing element shown in FIG. 1.

FIG. 2A depicts a functional block diagram of a DP node 200 disposed as part of a scalable cluster of a plurality of nodes of the routing element 100 shown in FIG. 1. Node 200 may comprise a logical node or a physical node, and may be representative of a data path node disposed in the DP cluster 104B. As a data path node, it can be a logical node in the sense of a partition or a part of the data plane, or a physical implementation, e.g., a line card in the ingress/egress of a port of the switching fabric of the routing element 100. In general, the functionality of node 200 involves responding to data traffic input and populating a database table 202 (e.g., a FIB) that is customized for the node. A local update buffer 206 is provided for maintaining a copy of the node-specific database under control of an update agent 204. An external signaling and control block 208 is provided for transmitting and receiving update messages to and from other data plane nodes via path 210.

By way of example, as a data plane node, node 200 includes a forwarding agent that is operable to switch the incoming packets or cells to appropriate output port of the logical/physical node based on the entry of the node-specific FIB that may be redundantly provided as database 202 and its corresponding update buffer 206. The update agent 204 is operable to update the entries in the FIB, mediated via the update buffer 206 when it is needed and requested and remains dormant otherwise. In turn, the update buffer 206 is coordinated with a corresponding RIB update buffer residing in the CP by means of a CP update agent as exemplified by CP node 200B shown in FIG. 2B. In other words, the data and control paths of the routing element are rendered disjoint, whereby the RIB and FIB tables are maintained, updated, and redundantly engineered, independently of the state of one another. Accordingly, when a fatal software/hardware failure is encountered in the control path (either due to intentionally-caused maintenance downtime or because of a legitimate fault), the CP domain may undergo a switchover from an active node to a standby node, but the forwarding agents in the DP domain may continue to execute packet forwarding processes for existing paths based on current update buffer conditions.

Figure 2B:
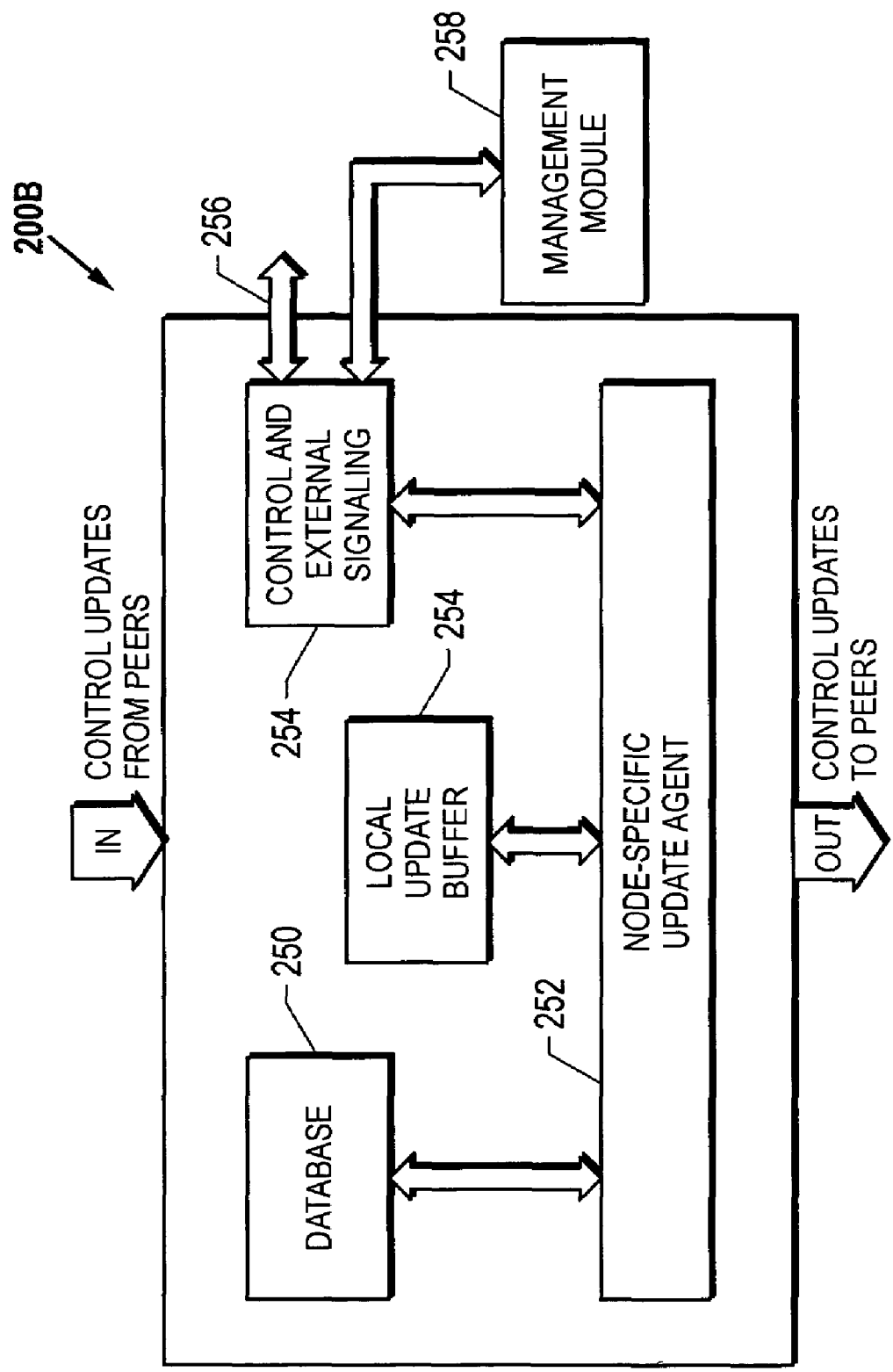
FIG. 2B depicts a functional block diagram of a control plane (CP) node disposed as part of a scalable cluster of a plurality of nodes of the routing element shown in FIG. 1.

Referring to FIG. 2B in particular, CP node 200B includes several functional and structural entities that are similar in their overall architectural interrelationship to the entities described above with respect to DP node 200A. As a control path node, node 200B is representative of the nodes disposed in the CP cluster 104A, and in general, it may also be provisioned as a logical partition. Responsive to control updates received from other peer entities in the network, CP node 200B is operable to maintain and update routing information with respect to the traffic encountered in the network. Further, responsive to internal control inputs and upstream control messages, CP node 200B is operable to generate appropriate control messages towards other peer elements in the network. A database 250 is provided for maintaining an RIB for the network element. A local update buffer 254 is provided for maintaining a copy of the RIB, whereby a node-specific update agent 252 is operable in conjunction with the RIB database(s) and buffer(s) for synchronizing with other RIB tables and their copies in the network element, mediated via a control and external signaling block 254 that is coupled to other CP nodes via path 256 when the control plane is active. In addition, the node-specific update agent 252 is operable to coordinate the updating of the network element's forwarding tables in an asynchronous manner using the node-specific DP update agents. A management module 258, which may be provided as part of a CP node or otherwise associated therewith, is operable to interact in the CP domain for providing appropriate management control with respect to the various CP nodes. For instance, management control may include forming groups and/or sub-groups of management nodes and selecting single or multiple group "leaders" by an election algorithm (e.g., a round-robin scheme). Due to redundant provisioning, when a management module (or a set) fails for some reason, another module or set may take over the control or leadership. Additional functionalities relating to management control in the context of effectuating continuous switchover in a network element will be set forth below.

Since the updating process between the CP domain nodes and DP domain nodes is coordinated and mediated via node-specific update agents, it should be appreciated that the FIB information in the DP nodes may not be reflective of the entire RIB of a network element but may be indicative of only what needs to be forwarded by a particular DP. Accordingly, the asynchronous updating process between the CP and DP domains results in partial updating of the forwarding data. Only specific information relevant to a DP node (e.g., a line card) is on the line card, and when a line card fails, the management/control plane decides which other line cards may take up the redistributed load (based on load balancing criteria, for example). Appropriate information may then be sent to the line cards via the update agents for redistributing the loads accordingly.

Figure 3:
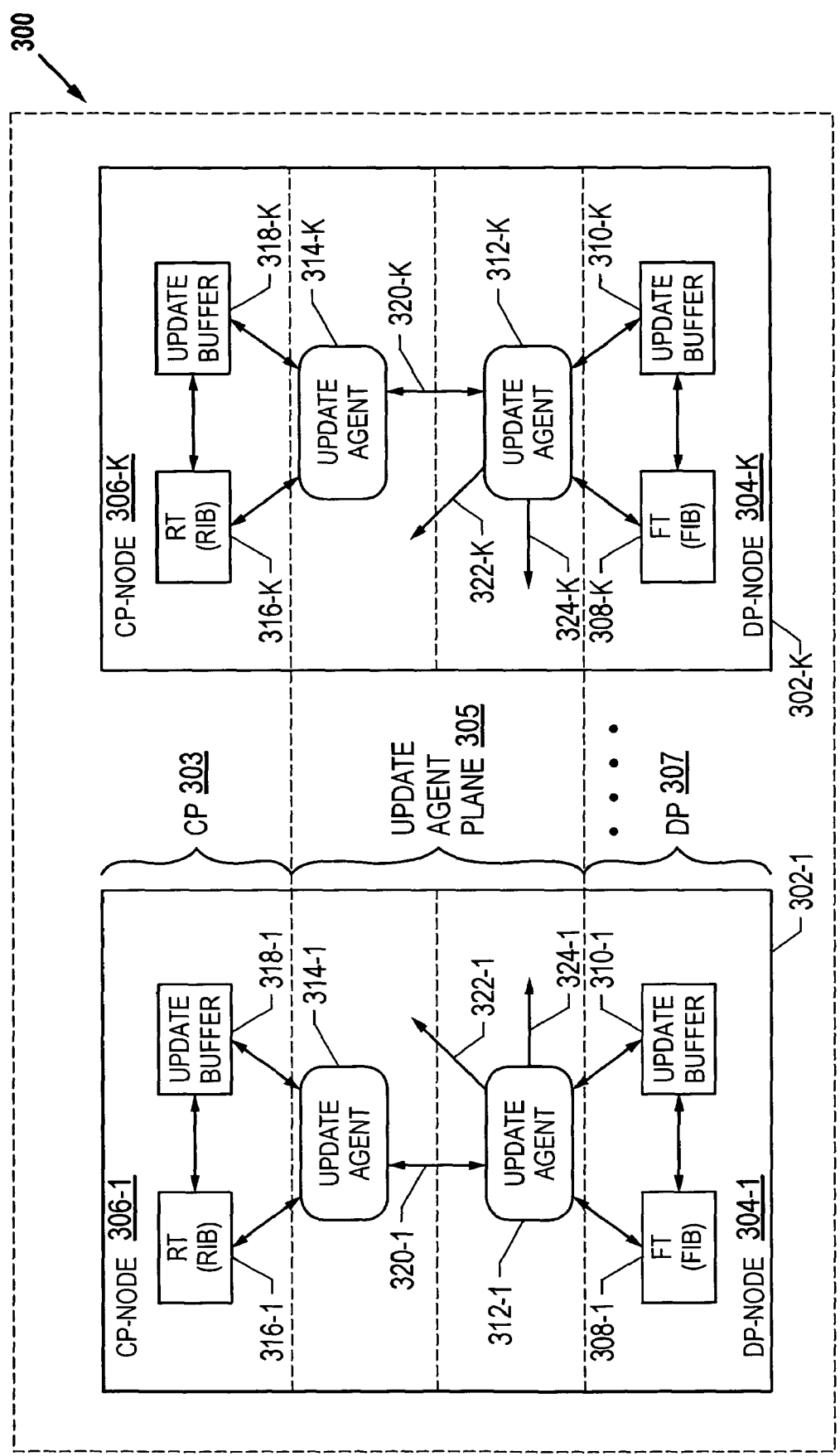
FIG. 3 depicts an embodiment of the invention with partitionable data and control planes with an update agent layer disposed therebetween.

Referring now to FIG. 3, shown therein is an embodiment of the invention with partitionable data and control planes 303, 307, respectively, with an update agent plane 305 disposed therebetween. In one implementation, the partitionable data and control planes may be resident in a scalable router 300 that is architected as a plurality of partitions, virtual, logical or physical, 302-1 through 302-K. Each partition may be comprised of one or more DP nodes and one or more CP nodes, with a portion of the update agent functionality coupling both types of nodes. By way of illustration, each partition is shown to include one DP-Node and one CP-Node, each node having its update agent that is operable to communicate with the other update agent, or with the agents of other partitions (in the same planar domain or across the plane boundary). Reference numerals 304-1 through 304-K refer to the K data path nodes that correspond to the control nodes 306-1 through 306-K.

The partitions of the control plane may be organized into multiple CP blades with redundancy, where a separate instance of each control plane process can run on each blade, one of the blades being active and the other blades being standby. Regardless of the blade architecture, each CP node of the partition includes an update agent that controls coordination between a routing table (i.e., RIB) used for effectuating the routing process supported by the node and its update buffer image. Although not specifically shown, one or more control processors are included for executing a routing process application based on applicable protocols. Since the router 300 may be implemented in a variety of communications networks for operation in conjunction with diverse peer elements, failover protection may be provided for several protocol processes executing on different nodes, e.g., Border Gateway Protocol (BGP), Intermediate System to Intermediate System (IS-IS), Open Shortest Path First (OSPF), Generalized Multi-Protocol Label Switching (GMPLS), Internet Group Management Protocol (IGMP), and the like.

Continuing to refer to FIG. 3, reference numerals 316-1 through 316-K, 318-1 through 318-K, and 314-1 through 314-K refer to the K routing tables, associated update buffers and CP update agents, respectively. A management/administration functionality structure may be provided as a separate module or integrated within one of the CP nodes for monitoring and detecting faults throughout the system.

Each data path node includes a node-specific and protocol-specific forwarding table (i.e., FIB) that is updated by a DP update agent in association with an update buffer. As explained in the foregoing discussion, the DP update agent is loosely coupled to a CP update agent for updating the entries of the FIB maintained at the data path node. Reference numerals 308-1 through 308-K, 310-1 through 310-K, and 312-1 through 312-K refer to the K forwarding tables, associated update buffers and DP update agents, respectively. Further, reference numerals 320-1 through 320-K, 322-1 through 322-K, and 324-1 through 324-K refer to the various coupling paths associated with CP-DP update agent coupling, cross-partition update agent coupling, and inter-DP update agent coupling.

In addition, those skilled in the art should recognize that although the control and data planes 303 and 307, and update agent plane 305 have been particularly described in reference to a scalable router architecture, the functionality of the disjointed planes may be distributed over a number of network elements interconnected in a communications network. Thus, a distributed network may be advantageously provisioned with elements having continuous switchover capability in accordance with the teachings of present invention. By way of exemplary implementation, such a distributed network can be symmetric, i.e. involving elements that have similar or the same capacity, or asymmetric (with nodes having different capacities). Moreover, such a distributed network may be topologically symmetric (i.e., regular) or asymmetric (i.e., irregular), as well.

Figure 4:
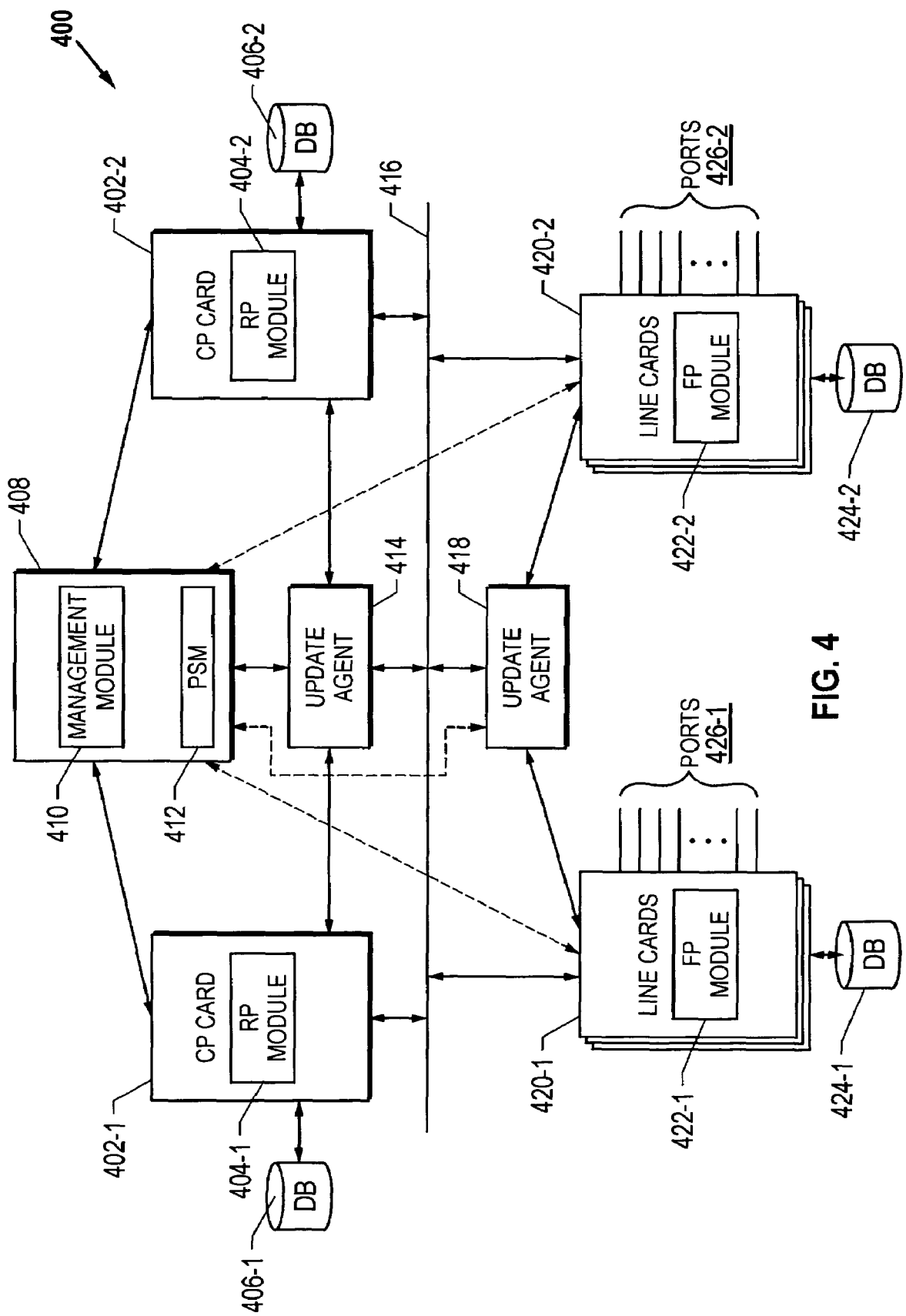
FIG. 4 depicts an exemplary implementation of a router in accordance with the teachings of the present invention.

FIG. 4 depicts an exemplary implementation of a router 400 in accordance with the teachings of the present invention. One or more CP cards, e.g., CP cards 402-1 and 402-2, may be organized into redundant CP blades, with one blade being active and the other(s) being switchover standby blade(s). Each CP card, which includes a routing process (RP) engine or module and associated database(s), may be inter-coupled to the other portions of the system, e.g., other CP cards, line cards, et cetera, via a system bus 416. Reference numerals 404-1 and 404-2 refer to two RP engines associated with the two exemplary CP cards 402-1, 404-2, respectively. Likewise, two database modules 406-1 and 406-2 are exemplified with respect to the CP cards for maintaining redundant RIB instances. An update agent 414 is provided to effectuate protocol stack synchronization among the various CP cards.

Reference numerals 420-1 and 420-2 refer to a plurality of line card partitions of the router 400, wherein each line card is operable to support a number of ports e.g., ports 426-1 and 426-2, which can be optical, electrical, or opto-electrical ports. A data forwarding process (FP) engine or module (reference numerals 422-1 and 422-2) and associated database(s) (reference numerals 424-1 and 424-2) are provided for each line card for effectuating Layer-2 packet forwarding operations. A data path update agent 418 is operably coupled to the control path update agent 414 and the various line card partitions for updating and synchronizing local FIB(s) with other nodes and CP database(s) only when the CP is not down, i.e., at least one CP blade is active.

A management module 408 including a process status monitoring (PSM) block 412 is provided for effectuating management control with respect to fault tolerance. The PSM block 412 is operable to monitor various processes and modules of the router 400 for status changes so that conditions that may indicate software or hardware failures may be detected. Further, the PSM's functionality may also include determining whether a failure comprises a fatal error or fault that necessitates a continuous switchover (i.e., maintaining data forwarding processes non-disruptively while the router internally transitions to standby processes and modules). Additional related functionality of the PSM block 412 may include facilitating exchange of "heartbeat" messages between the processes on the active and standby CP nodes, and establishing internal consistency checks that monitor hardware and software applications.

Figure 5:
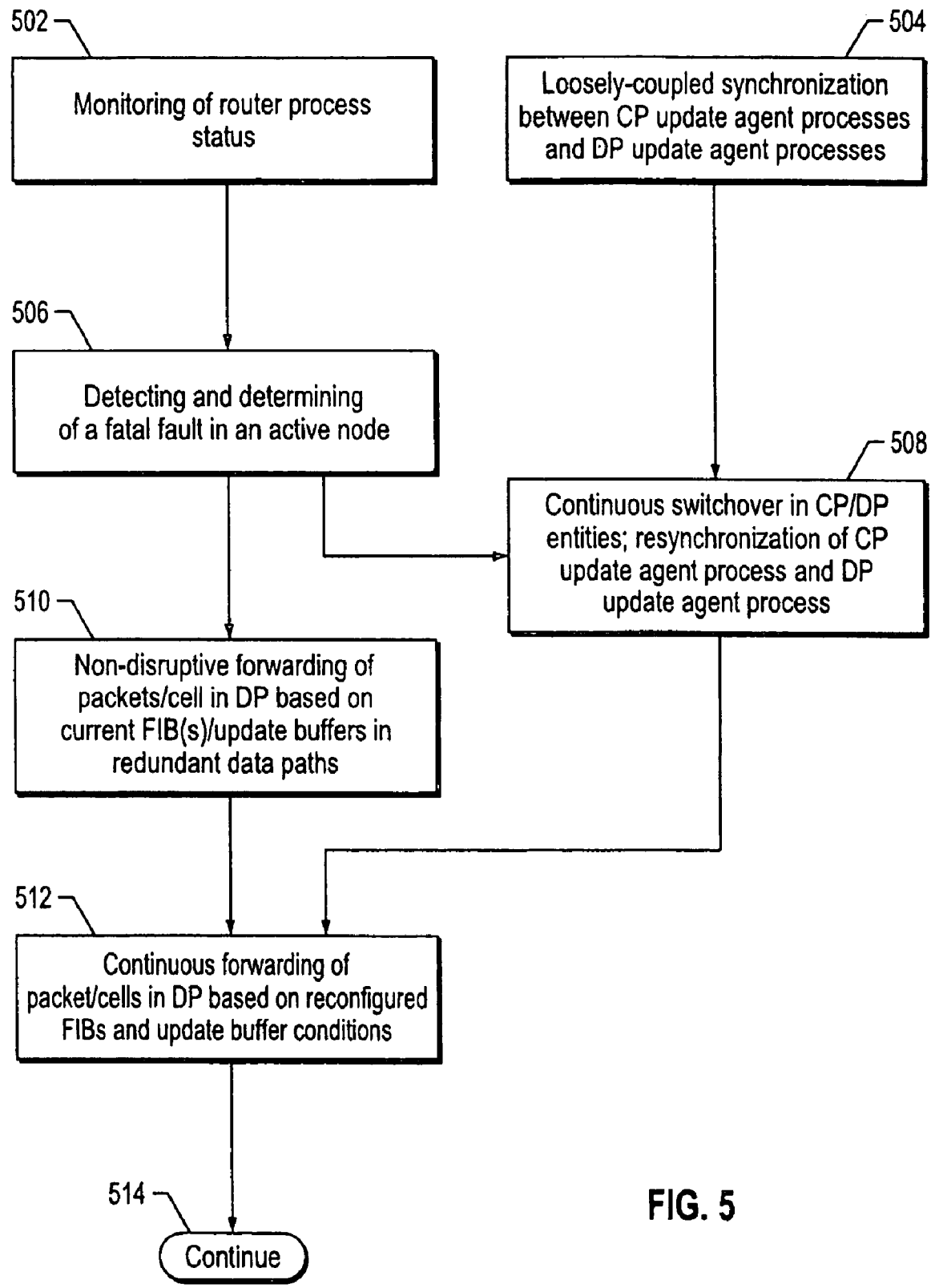
FIG. 5 depicts a flow chart of the various operations involved in effectuating a fault-tolerant non-disruptive routing methodology in accordance with an embodiment of the present invention.

Referring now to FIG. 5, depicted therein is a flow chart of the various operations involved in effectuating a fault-tolerant routing methodology in accordance with an embodiment of the present invention. In a monitoring operation, a router process status is checked (block 502) for status changes, internal consistencies, and the like, in an architecture that support loosely-coupled synchronization between its CP and DP nodes mediated by means of asynchronous and disjoint CP and DP update agent processes (block 504). Accordingly, as described hereinabove, there is no tight coupling between the various routing processes, i.e., each process is supported independently of another. Further, the updating of FIBs is coordinated preferably based on the status and contents of the updated RIBs with respect to active CP blades.

When the PSM functionality of the router detects and determines a fatal fault in an active node of the router (block 506), the fault is localized and a continuous switchover is effectuated with respect to that node (either in the CP or DP domain) (block) 508). As a result, non-disruptive forwarding of the ingress packets or cells continues to take place in other data paths of the DP domain based on current update buffer and FIB conditions in the redundant data paths (block 510). Since the continuous switchover process takes place internally within the router (i.e., no control updates are generated towards the peer elements to which the router is coupled), the existing links involving the router continue to be maintained. Thus, even where a routing protocol requires that the underlying TCP/IP mechanism continuously provide status update information to the peers, there will be no teardown of the connections. In other words, there is no route flapping in the network due to fatal errors in the router's architecture, thereby greatly enhancing availability.

Upon completion of the switchover operation, a redundant CP node or blade becomes active, which condition is propagated throughout the router for recommencing the CP and DP update agent processes (i.e., resynchronization of the CP and DP domains) (block 508). Data forwarding processes continue uninterrupted based on the reconfigured update buffers and FIBs (block 512). The routing process methodology continues thereafter in normal manner using loosely-coupled, disjoint synchronization between the reconfigured DP/CP domains (block 514).

Based upon the foregoing Detailed Description, it should be readily apparent that the present invention advantageously provides a fault-tolerant routing architecture that is scalable and adaptable to any cluster-based or interconnection-based router design. By rendering the CP and DP domains disjoint and independently redundant, the effect of a fatal fault in one section of the router can be isolated from the remaining portions of the distributed design, which can continue to process the incoming data while the switchover process takes place.

It is believed that the operation and construction of the present invention will be apparent from the foregoing Detailed Description. While one or more of the exemplary embodiments of the invention shown and described have been characterized as being preferred, it should be readily understood that various changes and modifications could be made therein without departing from the scope of the present invention as set forth in the following claims.

What is claimed is:

1. A router, comprising:
   a partitioned data plane including a plurality of forwarding tables, each forwarding table including forwarding information that effectuates a data forwarding process through said router;
   a partitioned control plane including a plurality of routing tables operating under control of at least one routing protocol process, said routing tables including information that effectuates routing decisions with respect to said data forwarding process;
   a partitioned update agent plane coupled to both said partitioned data plane and said partitioned control plane, said partitioned update agent plane comprising:
      a control plane update agent module that maintains at least one redundant set of routing table information in a plurality of control plane update buffers that are coupled to said plurality of routing tables, wherein said control plane update buffers are located on said control plane, and wherein said control plane update agent module synchronizes said routing tables to each other; and
      a data plane update agent module operably coupled to said control plane update agent module to coordinate said forwarding information with said routing table information in association with a plurality of data plane update buffers that are coupled to said forwarding tables, wherein said data plane update buffers are located on said data plane, and wherein said forwarding tables are maintained, updated, and redundantly engineered independently of failures on said routing tables.

2. The router as set forth in claim 1, wherein said data forwarding process continues to proceed in an event of failure based on information stored in at least one of said data plane update buffers and said control plane update buffers.

3. The router as set forth in claim 2, wherein said event of failure comprises a failure associated with said partitioned data plane.

4. The router as set forth in claim 2, wherein said event of failure comprises a failure associated with said partitioned control plane.

5. The router as set forth in claim 2, wherein said partitioned data plane comprises a plurality of data plane nodes, each having at least one forwarding table and at least one data plane update buffer.

6. The router as set forth in claim 5, wherein said plurality of data plane nodes are organized into a scalable cluster.

7. The router as set forth in claim 5, wherein said data plane update agent module comprises a plurality of data plane update agents, each being associated with a data plane node.

8. The router as set forth in claim 5, wherein said plurality of data plane nodes are organized into a distributed network having a topology selected from the group consisting of ring topologies, star topologies, Clos topologies, toroid topologies, hypercube topologies and polyhedron topologies.

9. The router as set forth in claim 2, wherein said partitioned control plane comprises a plurality of control plane nodes, each having at least one routing table and at least one control plane update buffer.

10. The router as set forth in claim 9, wherein said plurality of control plane nodes are organized into a scalable cluster.

11. The router as set forth in claim 9, wherein said control plane update agent module comprises a plurality of control plane update agents, each being associated with a control plane node.

12. The router as set forth in claim 9, wherein said plurality of control plane nodes are organized into a distributed network having a topology selected from the group consisting of ring topologies, star topologies, Clos topologies, toroid topologies, hypercube topologies and polyhedron topologies.

13. A distributed network, comprising:
a first network element that routes data; and
a second network element coupled to said first network element, wherein said first network element and said second network element are each comprised of a router with decoupled control and data planes and a separate update agent plane further comprising a control plane update module that synchronizes a plurality of routing tables to each other on said control plane, whereby forwarding tables are maintained, updated, and redundantly engineered independently of failures on said routing tables,
wherein said router comprises:
a plurality of control plane nodes that effectuate routing process functionality based on control updates from peer elements in said distributed network, each control plane node including a routing information database with routing tables and a control plane update buffer;
a plurality of data plane nodes that forward data based on said routing process functionality, each data plane node including a forwarding information database with forwarding tables and a data plane update buffer; and
the separate update agent plane comprising a control plane update agent that synchronizes said routing tables on said control plane node and a data plane update agent that synchronizes said forwarding tables on said data plane node, wherein said data plane update agents and control plane update agents update said forward information databases and said routing information databases in an asynchronous manner.

14. The distributed network as set forth in claim 13, wherein said plurality of control plane nodes and said plurality of data plane nodes are organized in a logically disjoint, distributed architecture.

15. The distributed network as set forth in claim 13, wherein said distributed architecture comprises a scalable cluster having a topology selected from the group consisting of ring topologies, star topologies, Clos topologies, toroid topologies, hypercube topologies and polyhedron topologies.

16. The distributed network as set forth in claim 13, wherein said data plane update buffers and said control plane update buffers are updated by said data plane update agents and said control plane update agents in an asynchronous manner.

17. The distributed network as set forth in claim 13, wherein said data plane nodes continue to forward data upon detecting a fault condition in at least one of said control plane node.

* * * * *

UNITED STATES PATENT AND TRADEMARK OFFICE
CERTIFICATE OF CORRECTION

PATENT NO. : 7,606,140 B2
APPLICATION NO. : 10/651134
DATED : October 20, 2009
INVENTOR(S) : Prasad N. Golla It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1382 days.

Signed and Sealed this

Fifth Day of October, 2010

David J. Kappos
*Director of the United States Patent and Trademark Office*